United States Patent Office 3,421,817
Patented Jan. 14, 1969

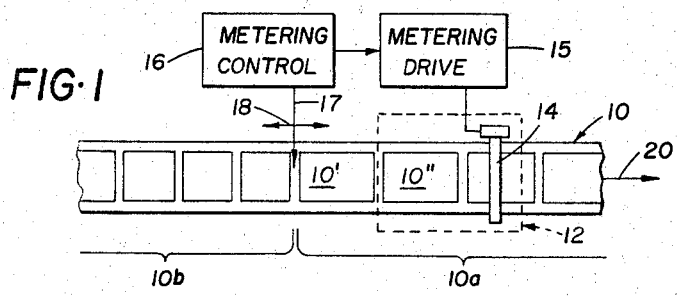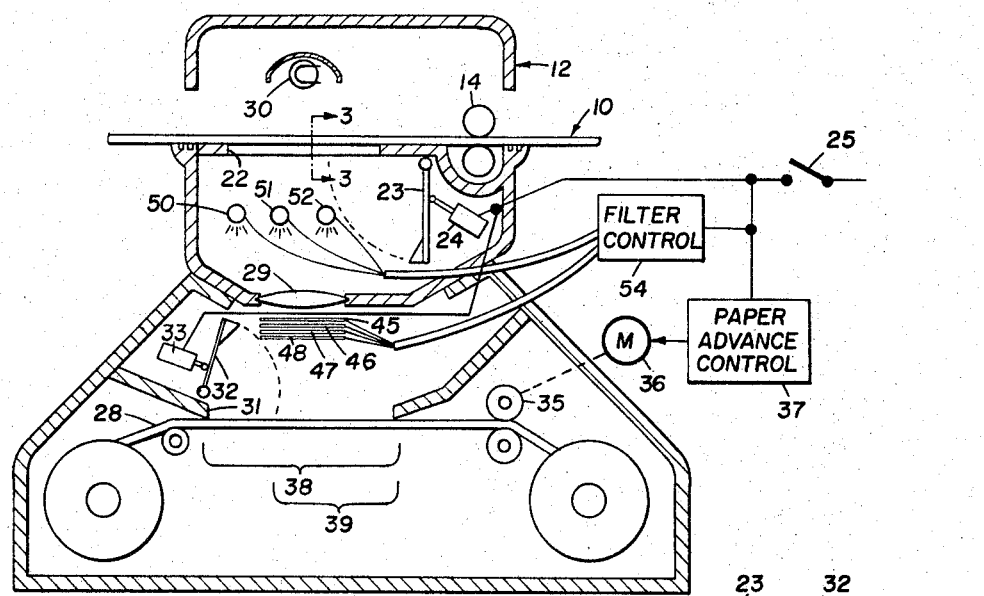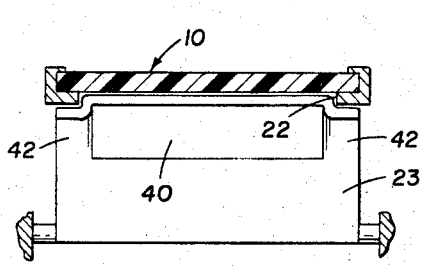

3,421,817
PROJECTION PRINTER
David N. Schwardt, Rochester, N.Y., assignor to Eastman Kodak Company, Rochester, N.Y., a corporation of New Jersey
Filed Apr. 12, 1965, Ser. No. 447,385
U.S. Cl. 355—36        11 Claims
Int. Cl. G03b 27/76

ABSTRACT OF THE DISCLOSURE

A projection printer has a high speed change-over system for printing of different size images on film strips. Negative and paper masking apertures have corresponding sides simultaneously masked or unmasked. The operation of photosensitive paper advance means is adjusted to advance a length of paper corresponding to the paper frame size. Adjustment is provided for proper color-balance-correcting of the images by controlling the position of color filters.

---

The present invention relates to a projection printer and more particularly to a high speed change-over system for projection printing of a film strip having different size images thereon.

Many automatic printers are known which project a plurality of images on a photosensitive printing paper by means of passing light through images of a developed negative film strip comprising as many as a hundred or more film strips secured together. These film strips may be secured together prior to their being developed whereby it will occur that some of the film strips have twelve square images per strip and others have eight rectangular (as distinguished from square) images per strip depending on the particular camera exposing the film. Although the submitter of the film strip of 120 or 620 film for processing sometimes is requested to indicate whether eight or twelve images appear on the film, such information is not reliable. Thus, it often occurs that a square image film strip will appear in a group having rectangular images and vice versa. One solution to this problem has been to skip a strip of the variant format and return that strip through the printer in a film strip of its format type.

Therefore, there has long existed a need, in such projection printers, for a simple and rapid means of converting between square and rectangular exposure prints. In several of the prior art projection printers, this proved to be rather complex because of the alignment of the image in accordance with the center of the masking frame used during projection printing. I have found that it is feasible to align the image with an edge of the exposure mask whereby a transformation between square and rectangular format exposures is greatly simplified.

Therefore, an object of the present invention is to provide a projection printer having an arrangement for changing set-ups to allow rapid and uninterrupted printing of a film strip having both 8- and 12-exposure film strips therein.

In accordance with one embodiment of my invention, a change-over switch is provided to change the negative masking aperature by covering one side thereof, the paper masking aperture by covering a corresponding side thereof to obtain properly masked prints, the photosensitive paper advance means to prevent waste of paper by excessive borders and the timing signal to attain properly color-balance-corrected images on a photosensitive paper irrespective of whether rectangular or square exposures appear on various portions of the film strip.

The subject matter which is regarded as my invention is particularly pointed out and distinctly claimed in the concluding portions of this specification. The invention, however, as to its organization and operation, together with further objects and advantages, will best be understood by reference to the following description taken in connection with the accompanying drawing, in which:

FIG. 1 is a simplified schematic top plan view of one printer adapted to use in my invention;

FIG. 2 is a view partially in section and partially diagrammatically illustrating one embodiment of my invention;

FIG. 3 is a detail view taken along the line 3—3 of FIG. 2; and

FIG. 4 is a simplified wiring diagram illustrating the several circuit components directly involved in the present invention.

Referring now to the drawing, wherein like numbers indicate similar parts, I have shown in FIG. 1 a film strip 10 comprising an 8-exposure film strip section 10a having a rectangular (oblong) image format and a 12-exposure film strip section 10b having a square format image. The film strip 10 is of a normal size such as 620 or 120. The strip sections 10a and 10b have been secured together with other film strip sections prior to developing to form the long film strip 10 suitable for "automatic" developing and sequential projection printing.

The film strip 10 is moved through a printer station 12 indicated in phantom in FIG. 1 with the precise positioning of the film strip being accomplished by metering rollers 14 under the control of metering drive 15. The advance of the rollers by the metering drive 15 is under the control of a metering control 16 which is responsive to the positioning of a pointer 17 at a trailing edge of an image 10'. The image 10' is next to be placed in the framing aperture presently occupied by an image 10'' being printed. The pointer 17 is movable along the path of movement of the film strip as indicated by a double ended arrow 18, and the film 10 advances as indicated by an arrow 20 to present each image to the printer station 12. The controlling relationship between the pointer 17 and the metering rollers 14 is explained in greater detail in a copending U.S. Patent application Ser. No. 447,386, now U.S. Patent 3,369,449, filed concurrently herewith in the names of R. E. Klauss and M. A. Petrano and assigned to the assignee of the present invention. By means of this positioning system, the distance measured is between the nearest edge of the masking aperture 22 (FIG. 2) and the trailing edge of the image (10') being detected. Thus a corresponding edge of each image is aligned with the nearest edge of the mask 22.

Referring now to FIG. 2, when the film strip 10 contains square image exposures as indicated at 10b, the masking aperture 22 is reduced by an auxiliary masking means in the form of a flap 23 to two-thirds of its nominal size whereby it will properly mask the smaller image. Because the images are each aligned with the nearest edge of the mask 22, the flap 23 is arranged to further mask only one end; the further end of the mask 22. The flap 23 is controlled by a means such as a solenoid 24 which is energized by a change of set-up or change-over switch 25 whenever the operator recognizes that a 12-exposure (square) film strip is to be printed.

A photosensitive paper web 28 is positioned below the mask 22 whereby a lens 29 transmits light thereto from a lamp 30 positioned above the masked negative image. The print area of the paper 28 is framed by another mask 31 to define the exposure area on the paper. At such times as the 12-exposure (square) film 10b is being printed, a second auxiliary masking means illustrated in the form of a flap 32 reduces the exposure area of the paper web 28 in accordance with the energization of a solenoid 33. The solenoid 33 is energized also by the switch 25 at the same time, i.e., in the same mode as the solenoid 24.

Obviously, when the smaller square prints are being made, it is not necessary to advance the paper 28 as great a distance as when the larger rectangular prints are being made. Thus, a pair of paper drive rollers 35 being driven by a paper advance motor 36 need not be operated for as long a period. This may be accomplished in a conventional manner in accordance with the paper advance control 37. The change-over is the same as would be made in converting from a square format film strip 10 to a rectangular format film strip in prior art machines. This change in prior art machines often entails simply changing a switch to energize a different stop element in the paper advance control 37. The paper advance control 37 is also receptive of a signal from the switch 25 to effect this conventional change whereby prints of the size of a film strip illustrated as 10a require a paper advance as indicated by a bracket 38. When the smaller print sizes are being made, the paper advance will be reduced as illustrated as by a bracket 39.

Referring now to FIG. 3, I have shown an end view of the flap 23 in the closed position. I prefer that this flap be provided with a raised portion 40 that is positioned adjacent to the film strip 10 when support flanges 42 engage the lower side of the framing mask 22 as indicated. Thus the flap 23 may be quickly and accurately positioned without substantial deforming deflection and resulting damage to the film strip 10. By placing the raised portion 40 closely adjacent to the film strip 10 as is the mask 22 itself, unwanted scatter light tends to be eliminated. The flap 32 is preferably of a similar construction to similarly eliminate scatter light exposure of the border around the print, to thus effect a sharp print border.

Referring again to FIG. 2, the light control filters 45, 46 and 47 and a shutter 48 are for regulating the color balance and the exposure of the paper 28. In the usual prior art color printer, the filters will be cyan, magenta and yellow. These filters along with the shutter 48 are withdrawn from the light path during the initial printing of each image. However, color correction techniques require that the filters be selectively placed in the light path to attain a color balanced print. Experience indicates that detection of each color of light passing to the print is required. This is accomplished by selective red, green and blue photodetector systems as indicated at 50, 51 and 52 respectively placed on at least one side of the light path for receiving scatter light from the negative. These photodetector systems supply signal information to a filter control circuit 54 of a type which is well known to thus regulate the filter individually as is the usual practice of such color correction techniques. As a normal print cycle is terminated when all three of the filters are returned to the closed position, the shutter 48 closes and the motor 36 is energized to advance the paper 28.

However, when the total amount of light passing through the lens 29 is reduced by the closing of the flap 23, the scatter light passing to the detectors 50, 51 and 52 is also reduced, whereupon the signal information that is provided to the filter controller 54 would tend to be erroneous. Therefore, during exposure of a smaller print it is necessary to increase the effectiveness of this signal information whereby the filter control is properly calibrated. This is accomplished by a control element such as a solenoid coil 56 (FIG. 4) within the filter control 54. The particular circuit changes accomplished within the filter control upon energization of coil 56 are conventional to the prior art, well known, and need not be explained in detail here.

Referring now to FIG. 4, there is shown a schematic wiring diagram of the change-over control circuit. The switch 25 is arranged to energize solenoids 24, 33 and 56 and 58, the latter being a switch control element of the paper advance control 37. The solenoids 24 and 33 control the flaps 23 and 32 directly, and the other elements operate as discussed above and may use known techniques.

While I have shown a particular embodiment of this invention, modifications thereof will occur to those skilled in this art. For instance, the present invention may be used with printers other than the ones discussed or referred to herein. Also, the switch 25 may be made with several contacts to make all necessary circuit changes directly without aid of solenoids 56 and 58. I intend therefore to have the appended claims cover such embodiments as properly fall within the scope of the present invention.

I claim:

1. In a projection printer for printing either square or rectangular format images, the printer being adapted to receive a film strip consisting of a plurality of films secured together where some of the films have square image exposures and other of the film have rectangular image exposures, the printer having a negative framing mask having an aperture therethrough, the mask being of a size appropriate for rectangular image exposures, the printer having film metering drive means for aligning an edge of each image with a corresponding edge of the negative framing mask, the printer having a paper framing mask region and means for advancing an unexposed portion of a photosensitive paper web to an exposure position within the paper framing mask region after each exposure cycle, and a lens for transmitting light between the negative framing mask and the exposure position, the improvement comprising:

a change-over switch;
a first flap movable to reduce the negative framing mask to a square format in response to operation of said switch, said flap covering the portion of the framing aperture most remote from said corresponding edge;
a second flap movable to reduce the exposed area of the paper web in the exposure position to a square format corresponding to that transmitted by the lens, said second flap being responsive to operation of said switch in the same mode as said first flap;
means responsive to said switch for reducing the advance of the paper web when said switch is in the square format mode; and
color correcting filters;
a filter controller;
at least one selective color detecting means for furnishing signal information to the filter controller;
said switch, when in the square format mode, accomplishing circuit changes to increase the sensitivity of the filter controller to said signal information to thereby maintain calibration thereof despite the reduction of scatter light thereto.

2. In a projection printer for printing either square or rectangular format images, the printer being adapted to receive a film strip containing some square format images and other rectangular format images, the printer having a negative framing mask with an aperture therethrough, film metering drive means for advancing sequentially images to the negative framing mask at a printing station, a paper framing mask, means for advancing an unexposed portion of a photosensitive paper web to an exposure position within the paper mask after each exposure, a lens for transmitting light from the image at the negative framing mask to the web at the paper framing mask, the improvement comprising:

change-over switch means positionable in a first rectangular format mode and another format mode;
first flap means movable from an open position to a closed position to reduce the negative framing mask to a minimum format size;
operator means responsive to said switch means for moving said first flap means from one position to the other;
second flap means movable from an open position to a closed position to reduce the paper framing mask to a minimum format size corresponding to that of the negative framing mask;

operator means responsive to said switch means for moving said second flap means from one position to the other during corresponding motion of said first flap means;

means responsive to said switch means for reducing the advance of the paper web when said flaps are in the minimum format size position;

a color correcting filter;

a filter control circuit responsive to color sensitive detectors; and means for increasing the effective sensitivity of the filter control circuit to a signal from the color sensitive detectors when said first flap means is in the minimum format size position.

3. In a projection printer adapted to receive a strip of film having a plurality of individual images to be printed with some of the images being of a first size and other of the images being of a second size, the printer comprising a first framing mask having a framing aperture, the mask being large enough to properly frame the larger of said images, the printer having film metering drive means for sequentially advancing images of the film to the mask and for aligning an edge of each image with a corresponding edge of the framing mask, a second framing mask having a framing aperture, the metering drive means further comprising means for advancing an unexposed portion of a photosensitive receiver web to an exposure position within the second framing mask after each exposure cycle, and means for transmitting light through the image in the first framing mask to the portion of the web in said second framing mask during an exposure cycle, the improvement comprising:

means movable between two positions with respect to the first framing mask for adjusting the size of the aperture through the mask from a first size wherein images of the first image size can be properly framed to a second size wherein images of the second image size can be properly framed;

means for moving said adjusting means between its two positions;

means movable between two positions with respect to the second framing mask for adjusting the size of the aperture in the second framing mask thereby varying the area of the web subject to exposure in the exposure position;

means for moving said last-named adjusting means between its two positions;

means correlating operation of the adjusting means for the second framing mask and said film metering drive means for automatically varying the distance the web is advanced by said film metering drive means in accordance with the size of the second framing mask aperture so that the distance the web is advanced corresponds to the length of the web exposed through the aperture of the second framing mask; and control means for coordinating movement of said first framing mask adjusting means and said second framing mask adjusting means so that both apertures are adjusted for the size of the image in the first framing means.

4. The improvement as set forth in claim 3 wherein the means for moving both adjusting means comprises solenoids; and said control means comprises an electrical circuit including a conductive coil for each of said solenoids and a change-over switch, said switch being connected in the circuit in relation to the coils to effect simultaneous operation of the solenoids and thereby effect simultaneous movement of both adjusting means.

5. The improvement as set forth in claim 4 wherein said switch in said circuit is coupled to said varying means for the paper web whereby said varying means is regulated by operation of said change-over switch.

6. The improvement as set forth in claim 3 wherein the adjusting means for the negative framing mask has portions thereof in close fitting relation with portions of the mask bounding the aperture in the mask when said negative framing mask adjusting means is positioned for reducing the size of the mask aperture.

7. The improvement as set forth in claim 3 wherein the adjusting means for the negative framing mask comprises a portion offset from the edges thereof to permit reception of the offset portion within the boundary of the aperture in the negative framing mask wherein it is in close proximity to film in the mask when said negative framing mask adjusting means is positioned for reducing the size of the mask aperture.

8. The improvement as set forth in claim 3 wherein the projection printer further comprises a plurality of color correcting filters and a filter control for selectively moving the filters into and out of an operative position between said negative framing mask and said paper framing mask, said printer further comprising:

at least one selective color detecting means for providing a signal to the filter control; and means coupling said control means to said filter control for changing the sensitivity of said control in response to the movement of said adjusting means thereby to obtain proper calibration of the control for operation of the printer when said adjusting means are in either of their positions.

9. In a projection printer adapted to receive a strip of negative film having a plurality of individual images with some of the images being of a first size and other of the images being of a second size, the printer comprising a negative framing mask having a framing aperture, the mask being large enough to properly frame the larger of said images, the printer having film metering drive means for advancing images of the film to the mask and for aligning an edge of each image with a corresponding edge of the framing mask, a paper framing mask having a framing aperture, the metering drive means further comprising means for advancing an unexposed portion of a photosensitive paper web to an exposure position within the paper framing mask after each exposure cycle, and means for transmitting light through the image in the negative framing mask to the paper in said paper framing mask during an exposure cycle, the improvement comprising:

a flap movable between a first position out of alignment with the aperture in the negative framing mask and a second position wherein the flap partially blocks the passage of light through said aperture thereby reducing the size of the aperture in the negative framing mask;

means for moving said flap between said first and second positions;

a second flap movable between a first position wherein it is out of alignment with said aperture in said paper framing mask and a second position wherein the second flap blocks the passage of light through a portion of said aperture in the paper framing mask thereby to effectively reduce the size of said aperture in said framing mask;

means for moving said second flap between said first and second positions;

a switching member movable between two positions;

means coupling said switching member to both of said flap moving means to coordinate movement of said flaps between their first and second positions in response to movement of said switch member between its first and second positions; and means for varying the length of the unexposed portion of the paper web advanced by the metering drive means, said varying means being coupled to said switching member so that a first length of paper web is advanced when such switching member is positioned for moving the flaps to their first positions and a second length of paper web is advanced when the switching member is positioned for moving the flaps to their second position.

10. The improvement as set forth in claim 9 wherein the projection printer further comprises a plurality of color correcting filters and a filter control for selectively moving the filters into and out of an operative position between said negative framing mask and said paper framing mask, said printer further comprising:
  at least one selective color detecting means for providing a signal to the filter control; and
  means coupling said switch member to said filter control for changing the sensitivity of said control in response to the movement of said flaps thereby to obtain proper calibration of the control for operation of the printer when the flaps are in either of their positions.

11. The improvement as set forth in claim 9 wherein at least one of said flaps has a first portion engageable with the mask when the flap reaches its second position, and said flap has a second portion positionable across the aperture in the respective mask and closely adjacent to the edges of the aperture therein to minimize transmission of scatter light through the portion of the aperture covered by said flap.

References Cited
UNITED STATES PATENTS

| | | | |
|---|---|---|---|
| 2,927,503 | 3/1960 | Zollinger | 88—24 |
| 3,282,153 | 11/1966 | Chen et al. | 88—24 |

NORTON ANSHER, *Primary Examiner.*

RICHARD A. WINTERCORN, *Assistant Examiner.*

U.S. Cl. X.R.

355—38, 74, 75